(12) United States Patent
Siegl et al.

(10) Patent No.: US 11,912,458 B2
(45) Date of Patent: Feb. 27, 2024

(54) PLASTIC CONTAINER HAVING AT LEAST A REGIONAL SHARP-EDGED CONTAINER GEOMETRY AND PROCESS FOR PRODUCING THE PLASTIC CONTAINER

(71) Applicant: ALPLA Werke Alwin Lehner GmbH & Co. KG, Hard (AT)

(72) Inventors: Robert Siegl, Dornbirn (AT); Christian Zmölnig, Schwarzach (AT)

(73) Assignee: ALPLA Werke Alwin Lehner GmbH & Co. KG, Hard (AT)

(*) Notice: Subject to any disclaimer, the term of this patent is extended or adjusted under 35 U.S.C. 154(b) by 410 days.

(21) Appl. No.: 17/295,662

(22) PCT Filed: Nov. 5, 2019

(86) PCT No.: PCT/EP2019/080265
§ 371 (c)(1),
(2) Date: May 20, 2021

(87) PCT Pub. No.: WO2020/104187
PCT Pub. Date: May 28, 2020

(65) Prior Publication Data
US 2022/0009667 A1 Jan. 13, 2022

(30) Foreign Application Priority Data
Nov. 22, 2018 (CH) .................... 1443/18

(51) Int. Cl.
*B65D 1/02* (2006.01)
*B29C 49/00* (2006.01)
*B29K 67/00* (2006.01)

(52) U.S. Cl.
CPC .......... *B65D 1/023* (2013.01); *B29C 49/0005* (2013.01); *B65D 1/0215* (2013.01); *B29K 2067/00* (2013.01); *B65D 2501/0009* (2013.01)

(58) Field of Classification Search
CPC .......... B65D 23/00; B65D 11/04; B65D 1/02; B65D 1/023; B65D 1/0215;
(Continued)

(56) References Cited

U.S. PATENT DOCUMENTS 3,662,048 A * 5/1972 Turner .................... B29C 49/46
425/525
4,512,948 A * 4/1985 Jabarin .................... B29C 71/02
264/528
(Continued)

FOREIGN PATENT DOCUMENTS

DE  38 75 965 T2  4/1993
DE  695 16 506 T2  8/2000
(Continued)

OTHER PUBLICATIONS

International Search Report Corresponding to PCT/EP2019/080265 dated Jan. 28, 2020.
(Continued)

*Primary Examiner* — Kareen K Thomas
(74) *Attorney, Agent, or Firm* — Finch & Maloney PLLC

(57) ABSTRACT

A plastic container manufactured from a preform with a mass share of at least 80% polyester and possibly an additive from the group consisting of dyes, fillers, catalysers, additives and lubricative additives. The plastic container comprises a container neck and a container shoulder which connects with the container neck and merges into a container body closed by a container base. The container shoulder, the container base and the container body are exclusively reshaped by a 2-stage stretch blow moulding method. The polyester is a copolyester and comprises groups which originate from the monomers cyclohexanedimethanol (CHDM) and/or monoethylene glycol (MEG), terephthalic acid (TPA) or its derivatives and isophthalic acid (IPA) or its derivatives. At least a part-region of the container body (Continued)

and/or of the container shoulder comprises a sharp edge with a radius of less than 0.5 mm. A method of manufacturing the plastic container is also described.

19 Claims, 1 Drawing Sheet

(58) Field of Classification Search
 CPC .......... B65D 2501/0009; B65D 1/0223; B65D 1/0207; B29C 2049/4861; B29C 66/5452; B29C 63/423; B29C 49/0005; B29C 49/087; B29C 2049/4838; B29C 2049/7879; B29C 49/10; B29C 49/00; B29K 2067/00
 See application file for complete search history.

(56) References Cited

U.S. PATENT DOCUMENTS

| | | | | |
|---|---|---|---|---|
| 4,725,464 | A | * | 2/1988 | Collette .............. B65D 1/0223 215/16 |
| 4,868,026 | A | | 9/1989 | Shimizu et al. |
| 4,883,631 | A | * | 11/1989 | Ajmera .............. B29C 49/6472 264/28 |
| 4,890,757 | A | * | 1/1990 | Robbins, III ........... B65D 1/42 220/675 |
| 5,102,705 | A | * | 4/1992 | Yammoto ............ B65D 1/0207 525/437 |
| 5,281,387 | A | * | 1/1994 | Collette ............... B29C 49/642 425/530 |
| 5,287,987 | A | * | 2/1994 | Gaiser ...................... F17C 1/16 220/62.22 |
| 5,303,834 | A | * | 4/1994 | Krishnakumar ... B65D 79/0084 220/666 |
| 5,518,791 | A | * | 5/1996 | Shimoda ................. B32B 27/36 428/36.2 |
| 5,582,788 | A | * | 12/1996 | Collette .............. B29C 45/7207 264/328.8 |
| 5,593,056 | A | | 1/1997 | Mero et al. |
| 5,628,957 | A | * | 5/1997 | Collette ............... B65D 1/0215 264/513 |
| 5,728,347 | A | * | 3/1998 | Collette .................... B32B 1/02 264/513 |
| 5,780,130 | A | * | 7/1998 | Hansen ................ B65D 1/0207 215/382 |
| 5,804,016 | A | * | 9/1998 | Schmidt ............... B65D 1/0215 264/513 |
| 5,902,539 | A | * | 5/1999 | Schmidt ................. C08G 63/80 264/513 |
| 5,952,066 | A | * | 9/1999 | Schmidt ............... B32B 27/306 428/35.8 |
| 6,011,132 | A | * | 1/2000 | Paschke .............. C08G 63/181 528/272 |
| 6,112,925 | A | * | 9/2000 | Nahill .................. B65D 1/0215 215/381 |
| 7,544,405 | B2 | | 6/2009 | Lepage |
| 2001/8000153 | | | 1/2018 | Derrien |

FOREIGN PATENT DOCUMENTS

| | | |
|---|---|---|
| EP | 2 583 903 A2 | 4/2013 |
| EP | 2 890 544 B1 | 11/2016 |
| EP | 3 263 312 A1 | 1/2018 |
| JP | 2000-229614 A | 8/2000 |
| JP | 2014-151914 A | 8/2014 |
| WO | 2005/102865 A1 | 11/2005 |
| WO | 2016/121890 A1 | 8/2016 |

OTHER PUBLICATIONS

Written Opinion Corresponding to PCT/EP2019/080265 dated Jan. 28, 2020.

* cited by examiner

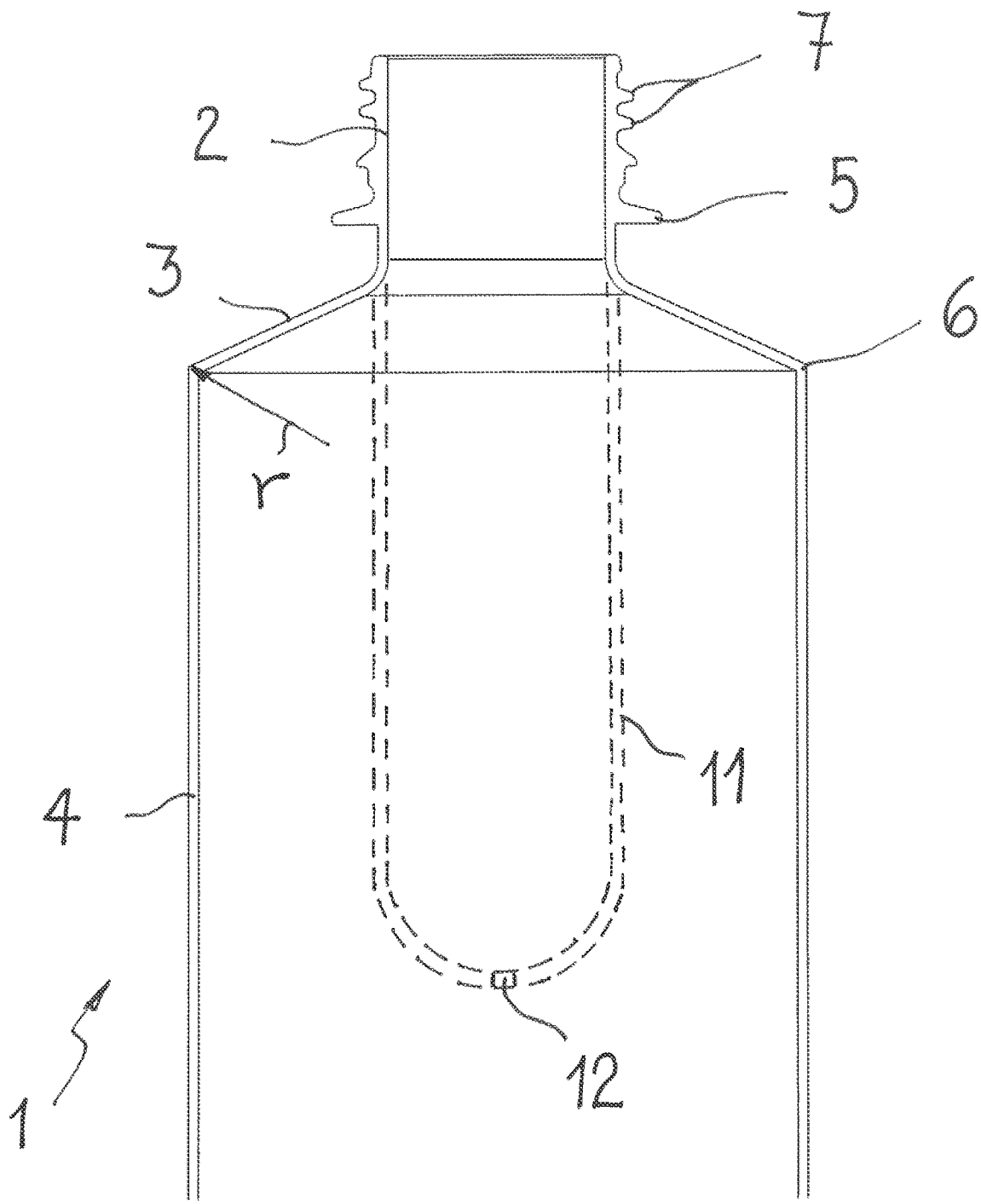

PLASTIC CONTAINER HAVING AT LEAST A REGIONAL SHARP-EDGED CONTAINER GEOMETRY AND PROCESS FOR PRODUCING THE PLASTIC CONTAINER

This application is a National Stage completion of PCT/EP2019/080265 filed Nov. 5, 2019, which claims priority from Swiss patent application serial no. 01443/18 filed Nov. 22, 2018.

FIELD OF THE INVENTION

The invention relates to a plastic container with a container geometry which at least in regions is designed in a sharp-edged manner. The invention also relates to a method for manufacturing the plastic container.

BACKGROUND OF THE INVENTION

Containers of tin sheet or aluminium sheet, of glass or of ceramic, such having been common in the past, are being increasingly replaced by containers of plastic. In is particularly for the packaging of fluid substances, for example for applications in the household, in agriculture, industry or commerce etc., that it is recently predominantly plastic containers which are applied. The low weight and the lower costs of course play a significant role in such a substitution. The use of recyclable plastic materials and the overall more favourable total energy balance on their manufacture also contribute to encouraging the acceptance of plastic containers by the users.

Single-layer or multi-layer plastic containers are often manufactured in the so-called extrusion blow moulding method, in particular a tube blow moulding method. The extrusion blow moulding machines which are applied for the extrusion blow moulding method typically comprise one or more extruders for feeding the necessary plastic material. The exit of the extruder is connected to an extruder head, at whose exit nozzle which can preferably be regulated in its opening width, the extruded tube exits. The extruded plastic tube can be constructed in a single-layered or multi-layered manner. The tube which exits from the exit nozzle in a continuous or quasi-continuous manner is inserted into a blow mould and after closure of the blow mould is inflated by way of overpressure with the help of a blowing mandrel which is moved into the mould cavity. The inflated plastic container is subsequently removed from the mould cavity. Extrusion blow moulded plastic containers can be identified by way of a squeeze fold which usually runs in the base region and originates from the squeezing of the extruded plastic tube on closing the blow mould.

Plastic containers of polyethylene terephthalate (PET) and similar materials are mostly manufactured in a so-called stretch blow moulding method. Herein, a preform is firstly manufactured in an injection moulding mould in an injection moulding method. Recently, also compression moulding methods or also extrusion blow moulding methods have been suggested for the manufacture of preforms. The preform comprises an essentially elongate preform body and is designed closed at its one longitudinal end. There, it is also common to find an injection point which originates from the injection moulding. A neck section which is provided with a pour-out opening connects onto the other end of the preform body. The neck section already has the later shape of the bottle neck. For this reason fastening means for the fixation of the closure part are usually already formed on the outer side of the neck section. The fastening means can be designed as structures, for example thread sections or similar projections or thread furrows or guide slots for a bayonet closure, said structures projecting or receding with respect to the neck wall. A so-called snap ring which projects radially from the periphery is often provided on the neck section. The snap ring serves as a counter bearing for a separable guarantee strip of a screwable screw closure for a plastic container which is stretch blow moulded from the preform or with oil bottles or the like serves for fastening the lower part of a usually applied hinge closure. Concerning most of the known preforms, the preform body and the neck section are separated from one another by way of a so-called support ring. The support ring projects radially form the neck wall and serves for the transport of the preform or of the plastic container which is manufactured therefrom and for a supporting of the preform on the blow moulding tool or of the plastic container on closure of this.

After its manufacture, the preform is removed from the mould and, still hot, can be immediately processed further in a single-stage stretch blow moulding method. Given a two-stage stretch blow moulding method, the preform is cooled and intermediately stored for a spatially and/or temporally separate further processing on a stretch blow moulding device. The preform is then conditioned where necessary, i.e. a temperature profile is imparted upon the preform, before the further processing in a stretch blow moulding device. It is subsequently brought into a blow mould of a stretch blow moulding device. In the blow mould, the preform is finally inflated according to the mould cavity by way of a fluid, usually air, which is blown in at overpressure, and is herein additionally axially stretched by a stretching mandrel.

An injection blow moulding method, concerning which the stretch blowing process is effected directly subsequent to the injection of the preform, is also already known. Herein, the preform remains on the injection core which at the same time forms a type of stretching mandrel. Again by way of overpressure, the preform is inflated according to the mould cavity of a blow mould which is extended onto the injection core or vice versa and herein is stretched by the stretching mandrel. The finished plastic container is subsequently removed from the mould. Stretch blow moulded or injection blow moulded plastic containers can be identified by way of the injection point which is usually arranged in the region of the container base, originates from the preform and in which the plastic material has only been slightly stretched or even not at all.

Plastic containers which at least in regions have sharp-edged container geometry are often desired by the market. The sharp-edgedness is herein to be present in the shoulder region and/or in the body region of the plastic container. The sharp-edgedness can be demanded for reasons of strength, for aesthetic reasons but also for other practical reasons, for example in order to achieve an improved handling ability or also a sealed stackability of the plastic container.

Sharp-edged in the context of the present invention is hereinto be defined by edges which have a radius of curvature of smaller than 0.5 mm. Whereas such sharp-edged geometries can be realised in the injection moulding method, with regard to the blow moulding methods which are known from the state of the art, only the smallest of radii down to 0.5 mm can be carried out. This is due to the fact that runny plastic masses as can be applied e.g. for injection moulding methods are not suited for blow moulding methods since they have the tendency to tear or burst on inflating. Sharp corners and edges however cannot be shaped with more viscous plastic masses which are very well suited to the blow moulding method. Plastics which are based on polyester, such as e.g. polyethylene terephthalate (PET), and which are particularly often used for an inexpensive manufacture of thin-walled plastic containers in the stretch blow moulding methods due to their good stretch setting have a tendency to strain harden given an intensive stretching. This means that given intensive stretching, these plastics stiffen to such an extent that it is no longer possible to blow out sharp-edged contours. Stretch-blown moulded plastic containers although in the region of the container neck being able to comprise projecting and receding structures, for example thread sections, thread flights or the like which are designed in a sharp-edged manner, this however is due to the fact that stretch blow moulded plastic containers are manufactured from a preform which is manufactured in an injection moulding method before the stretch blow moulding method. The neck section of the preform which is herein injection moulded as a rule is no longer deformed given the subsequent stretch blow moulding.

SUMMARY OF THE INVENTION

It is therefore an object of the present invention to remedy the outlined problems. A blow moulding method is to be modified to the extent that the manufacture of plastic containers with sharp-edged geometries in the container shoulder and/or in the container body is also rendered possible herewith. The basic course of the respective blow moulding method is herein to be able to be retained.

The solution to these objects lies in a plastic container with a container geometry which at least in regions is designed in a sharp-edge manner being manufactured in a blow moulding method which has the features which are specified in the independent claim(s). According to the invention, the objects are also achieved by a method which comprises the method features which are specified in the broadest method claim. Further developments and/or advantageous embodiments of the invention are the subject-matter of the respective dependent device and method claims.

The invention suggests a plastic container which is manufactured from a preform with a mass share of at least 80% polyester and possibly at least one additive from the group consisting of dyes, fillers, catalysers, additives and lubricative additives. The plastic container comprises a container neck and a container shoulder which connects onto the container neck and which merges into a container body which is closed with a container base. The container shoulder, the container base and the container body are reshaped exclusively by way of a blow moulding method in a 2-stage stretch blow moulding method. The polyester is a copolyester and comprises groups which originate from the monomers cyclohexanedimethanol (CHDM) and/or monoethylene glycol (MEG), terephthalic acid (TPA) or its derivatives and isophthalic acid (IPA) or its derivatives. At least a part-region of the container body and/or of the container shoulder comprises a sharp edge with a radius of less than 0.5 mm.

The stretch-setting and crystallisation of the plastic which is based on polyester is slowed down due to the copolyester. The strain hardening can be adapted by way of this, and sharp-edged structures with radii of curvature of less than 0.5 mm can also be manufactured in a blow moulding method. The sharp-edged structures can extend essentially in the radial direction. The sharp-edged structures however can also extend in the circumferential direction of the container body. The plastic container is manufactured in a 2-stage stretch blow moulding method. The stretch blow moulding method has been known for some time and permits the processing of a multitude of plastic formulations with short cycle times. The manufacturing of the plastic container exclusively by way of a blow moulding method can mean that the blow mould comprises no moving parts which after the blow moulding change the plastic container in its outer contour to the extent that a technical effect is achieved herewith. A technical effect can for example be the generation of a pulled-in base by way of a punch which moves into the cavity of the blow mould. The starting material according to the invention is also suitable for the processing in the injection moulding method for manufacturing the preform, from which the plastic container with sharp-edged structures is subsequently manufactured.

In a variant of the invention, the copolyester has an intrinsic viscosity which is measured according to ASTM D4603 of less than 0.75 dl/g, preferably of 0.60 dl/g to 0.73 dl/g, particularly preferably of 0.65 dl/g to 0.71 dl/g. By way of the selected intrinsic viscosity, the plastic is suitable for the manufacture of the preform in an injection moulding method as well as for the further reshaping of the preform in a blow moulding method. The selected intrinsic viscosity herein permits the formation of sharp edges on the plastic container, said edges having a radius of curvature of less than 0.5 mm.

Concerning a further embodiment of the invention, the copolymer has a density of 1.1 $g/cm^3$ to 1.3 $g/cm^3$. The selected density of the copolyester further improves the processing ability of the plastic.

Concerning a variant of the invention, the copolyester can consist of diol shares and dicarboxylic acid shares, which together result in 100% of the material quantity, wherein the diol share is 40% to 60% of the material quantity. The sum of the material quantity shares of cyclohexanedimethanol (CHDM) and monoethylene glycol (MEG) with respect to the diol share can be 100%, wherein cyclohexanedimethanol (CHDM) has a share of 0% to 100% of the material quantity of the diol share.

Concerning an alternative embodiment variant of the plastic container, the dicarboxylic acid share can consist of isophthalic acid or its derivatives and of terephthalic acid or its derivatives. The sum of the material quantity shares of isophthalic acid or its derivatives and of terephthalic acid or its derivatives can be 100% with respect to the dicarboxylic acid share, wherein isophthalic acid or its derivatives can have a share of 10% to 60% of the material quantity of the dicarboxylic acid share.

An embodiment of the plastic container can envisage the preform which is inserted into a blow mould being reshaped by way of the blow moulding method in a manner such that the container shoulder, the container base and the container body of the plastic container are formed from a preform body of the preform which projects into the blow mould and is closed at one side, according to an inner geometry of a cavity of the blow mould. The body of the plastic container with the blow moulding method is herein stretched along a middle axis of the preform by a factor of 2 to 4 with respect to the preform body. The plastic container comprises an adequately large mechanical strength and good barrier characteristics due to this degree of longitudinal stretching.

Depending on the composition of the starting material and on the method management for its manufacture, the plastic container can comprise at least one sharp edge with a radius of less than 0.3, preferably less than 0.1 mm.

The plastic container is preferably designed as one piece.

By way of the plastic container comprising walls which are of a single layer or multilayered, the plastic container is specifically optimised to the demands in its application.

Concerning an embodiment of the plastic container, the sharp edge can be shaped out at least on a part-region of a transition between the container shoulder and the container body. Disregarding aesthetic considerations, this design also has advantages with regard to the stiffness in the transition region from the container shoulder to the container body. Concerning further embodiments of the plastic container, alternatively or additionally to this, the container shoulder and/or the container body itself can be designed at least in regions with sharp-edged transitions which have radii of curvature of smaller than 0.5 mm. Herein, the plastic container can be designed in a single-layered or multi-layered manner.

Concerning a method for manufacturing the plastic container in a blow moulding method, the preform which is inserted into a blow mould is stretched with an axial stretching speed of about 1 m/s to about 3 m/s during the blow moulding method. Due to the high stretching speed, the molecule chains of the plastic material cannot slide on one another sufficiently rapidly. On account of this, the plastic container which is formed in the blow mould also cannot tear. Here too, the plastic material remains adequately deformable given such stretching conditions, in order to be able to produce sharp-edged structures.

Concerning a preferred method variant, the preform body is stretched along its middle axis by way of a stretching mandrel in a 2-stage stretch blow moulding method.

In order to further improve the effect of the high stretching speed, concerning a further variant of the method for manufacturing the plastic container, a fluid with a pressure of greater than 10 bar and smaller than 40 bar is brought into the preform which is heated to a defined temperature, for shaping out the container shoulder and the container body. Hereby, the fluid can be gas, preferably air, or a fluid.

The delay of the stretch setting of the plastic material on blow moulding, in a further method variant can yet be increased further by way of heating a blow mould with a cavity, along whose inner geometry the container shoulder, the container base and the container body are formed, to a temperature which is greater than 10° C. and smaller than 100° C.

BRIEF DESCRIPTION OF THE DRAWING

Hereinafter, the invention is explained with reference to the sole FIGURE, in which both a perform and a plastic container are illustrated in a schematic section.

BRIEF DESCRIPTION OF THE PREFERRED EMBODIMENTS

The plastic container in its entirety has the reference numeral 1. It is manufactured for example in a stretch blow moulding method from an injection moulded preform which in the drawing is indicated dashed and is provided with the reference numeral 11. The plastic container 1 comprises a container neck 2 and a container body 4 which is closed with a container base, and these are connected to one another via container shoulder 3. The container shoulder 3 is separated from the container neck 2 by way of a radially projecting support ring 5 and extends up to a transition 6 to the container body 4, wherein this transition is designed in a sharp-edged manner. In the context of the present invention, sharp-edged means that the container at the transition 6 has a radius of curvature r which is smaller than 0.5 mm. For example, the radius of curvature can be only 0.2 mm or 0.3 mm. The container neck 2 herein corresponds to the neck of the preform 11 which has been manufactured in an injection moulding method. With the stretch blow moulding method, the neck of the preform 11 is located outside the blow mould and is not reshaped any further. For this reason, the container neck can comprise structures 7 which are designed in a relatively sharp-edged manner. These however are not a consequence of the stretch blow moulding method but a result of the injection moulding method which also permits the manufacture of structures with radii of curvature of less than 0.5 mm. The sharp-edged structures 7 which are on the container neck 2 and which project or recede with respect to the container shoulder 3 and/or to the container body 4 can be for example thread sections, thread furrows or the like. Whereas a plastic container 1 with a support ring 5 is represented in the drawing, it is to be understood that the device according to the invention can also be envisaged for plastic containers without a support ring.

The plastic container 1 has an axial stretching ratio of 2 to 4 with respect to an axial extension of the preform 11. An injection point which is provided with the reference numeral 12 and which results from the injection moulding method is situated on the base of the preform, said preform being indicated in a dashed manner. In this region, the preform 11 is stretched only to an insignificant extent with the axial stretching procedure during the stretch blow moulding method. The injection point 12 is therefore usually evident also on the container base of the container 1 which is completed in its stretch blow moulding. In this manner, stretch blow moulded plastic containers 1 can be identified and differentiated from plastic containers which are manufactured in another manner, for example extrusion blow moulded plastic containers which usually comprise a squeeze fold in the base region.

The plastic container 1 according to the invention is manufactured from a preform which consists to at least 80% of polyester and possibly at least one additive from the group consisting of dyes, fillers, catalysers, additives and lubricant additives. The polyester is a copolyester and comprises groups which originate from the monomers cyclohexanedimethanol (CHDM) and/or monoethylene glycol (MEG), terephthalic acid (TPA) or its derivatives and isophthalic acid (IPA) or its derivatives. The copolyester has an intrinsic viscosity which is measured according to ASTM D4603 of less that 0.75 dl/g, preferably of 0.60 dl/g to 0.73 dl/g, particularly preferably of 0.65 dl/g to 0.71 dl/g. The copolyester has a density of 1.1 $g/cm^3$ to 1.3 $g/cm^3$. The copolyester consists of diol shares and dicarboxylic acid shares, which together result in 100% of the material quantity, wherein the diol share is 40% to 60% of the material quantity. The sum of the material quantity shares of cyclohexanedimethanol (CHDM) and monoethylene glycol (MEG) with respect to the diol share can be 100%, wherein cyclohexanedimethanol (CHDM) has a share of 0% to 100% of the material quantity of the diol share. The dicarboxylic acid share consists of isophthalic acid or its derivatives and of terephthalic acid or its derivatives. The sum of the material quantity shares of isophthalic acid or its derivatives and of terephthalic acid or its derivatives is 100% with respect to the dicarboxylic acid share, wherein isophthalic acid or its derivatives can have a share of 10% to 60% of the material quantity of the dicarboxylic acid share.

The reshaping of the preform into the plastic container 1 according to the invention is effected exclusively in a blow moulding method, preferably a stretch blow moulding method which is of two stages. Concerning the stretch blow moulding method, the heated preform which is inserted into a blow mould is stretched with an axial stretching speed of about 1 m/s to about 3 m/s with the help of a stretching mandrel during the stretch blow moulding method. The blow moulding pressure is herein about 10 bar to 40 bar. Herein, the blow mould is kept at a temperature larger than about 10° C., but smaller than 100° C.

The sharp-edged structures which are created on the plastic container 1 have a radius of curvature which is smaller than 0.5 mm, preferably smaller than 0.3 mm, preferably smaller than 0.1 mm. The sharp-edged structures can be arranged at the transition 6 from the container shoulder 3 to the container body 4. Concerning further embodiments of the plastic container 1, alternatively or supplementarily to this, the container shoulder 3 and/or the container body 4 can at least regionally be designed with sharp-edged transitions and/or structures which have radii of curvature of smaller than 0.5 mm. Herein, the plastic container 1 can be designed in a single-layered or multi-layered manner.

The invention is described with the example of a plastic container which is manufactured in a stretch blow moulding method. The aforementioned description however merely serves for the explanation of the invention and is not to be considered as limiting. In contrast, the invention is defined by the patent claims and the equivalents which are derived by the person skilled in the art and encompassed by the general inventive concept.

The invention claimed is:

1. A plastic container manufactured from a preform with a mass share of at least 80% polyester and at least one additive selected from a group consisting of dyes, fillers, catalysers, additives and lubricative additives, with a container neck and a container shoulder which connects with the container neck and merges into a container body which is closed by a container base,
wherein the container shoulder, the container base and the container body are exclusively reshaped by way of a 2-stage stretch blow moulding method,
the polyester is a copolyester and comprises groups which originate from monomers of cyclohexanedimethanol (CHDM) and/or monoethylene glycol (MEG), terephthalic acid (TPA) or its derivatives and isophthalic acid (IPA) or its derivatives, and
at least a part-region of the container body and/or of the container shoulder comprises a sharp edge with a radius of less than 0.5 mm.

2. The plastic container according to claim 1, wherein the copolyester has an intrinsic viscosity, which is measured according to ASTM D4603, of less than 0.75 dl/g.

3. The plastic container according to claim 1, wherein the copolymer has a density of 1.1 $g/cm^3$ to 1.3 $g/cm^3$.

4. The plastic container according to claim 1, wherein the copolyester consists of diol shares and dicarboxylic acid shares, which together result in 100% of a material quantity, wherein the diol share is 40% to 60% of the material quantity.

5. The plastic container according to claim 4, wherein a sum of the material quantity shares of cyclohexanedimethanol (CHDM) and monoethylene glycol (MEG) with respect to the diol share is 100% and CHDM has a share of 0% to 100% of the material quantity of the diol share.

6. The plastic container according to claim 4, wherein the dicarboxylic acid share consists of isophthalic acid or its derivatives and of terephthalic acid or its derivatives.

7. The plastic container according to claim 6, wherein a sum of the material quantity shares of isophthalic acid or its derivatives and of terephthalic acid or its derivatives is 100% with respect to the dicarboxylic acid share and isophthalic acid or its derivatives has a share of 10% to 60% of the material quantity of the dicarboxylic acid share.

8. The plastic container according to claim 1, wherein the preform which is inserted into a blow mould is reshaped by way of the blow moulding method in such a manner that the container shoulder, the container base and the container body of the plastic container are formed from a preform body of the preform which projects into the blow mould and is closed at one side, according to an inner geometry of a cavity of the blow mould, and the preform body is stretched along its middle axis by a factor of 2 to 4.

9. The plastic container according to claim 1, wherein the sharp edge has a radius of less than 0.3 mm.

10. The plastic container according to claim 1, wherein the plastic container is designed as one piece container.

11. The plastic container according to claim 1, wherein the plastic container comprises walls which are designed to be either single-layered or multi-layered.

12. The plastic container according to claim 1, wherein the sharp edge is shaped out at least on a part-region of a transition between the container shoulder and the container body.

13. A method of manufacturing the plastic container according to claim 1, wherein a preform body, which connects with a preform neck and is closed at one side, is stretched along a middle axis of the preform at a speed of about 1 m/s to about 3 m/s during a blow moulding method.

14. The method according to claim 13, wherein the preform body, during 2-stage stretch blow moulding method, is stretched along its middle axis by way of a stretching mandrel.

15. The method according to claim 13, wherein a fluid with a pressure of greater than 10 bar and less than 40 bar is brought into the preform which is heated to a predefined temperature for shaping out the container shoulder, the container base and the container body.

16. The method according to claim 13, wherein a blow mold with a cavity, having inner geometry for forming the container shoulder, the container base and the container body, are heated to a temperature which is greater than 10° C. and less than 100° C.

17. The plastic container according to claim 1, wherein the copolyester has an intrinsic viscosity which is measured according to ASTM D4603 of between 0.60 dl/g to 0.73 dl/g.

18. The plastic container according to claim 1, wherein the copolyester has an intrinsic viscosity which is measured according to ASTM D4603 of between 0.65 dl/g to 0.71 dl/g.

19. The plastic container according to claim 1, wherein the sharp edge has a radius of less than 0.1 mm.

* * * * *